Aug. 11, 1959 L. E. HAAGENSEN ET AL 2,899,196
UNIVERSAL FIXTURE FOR SUPPORTING VARIOUS PARTS TO BE WORKED
Filed July 21, 1954 3 Sheets-Sheet 1

INVENTORS
L. E. HAAGENSEN
J. R. JOHNSON
W. O. ODGERS
BY C. B. Hamilton
ATTORNEY

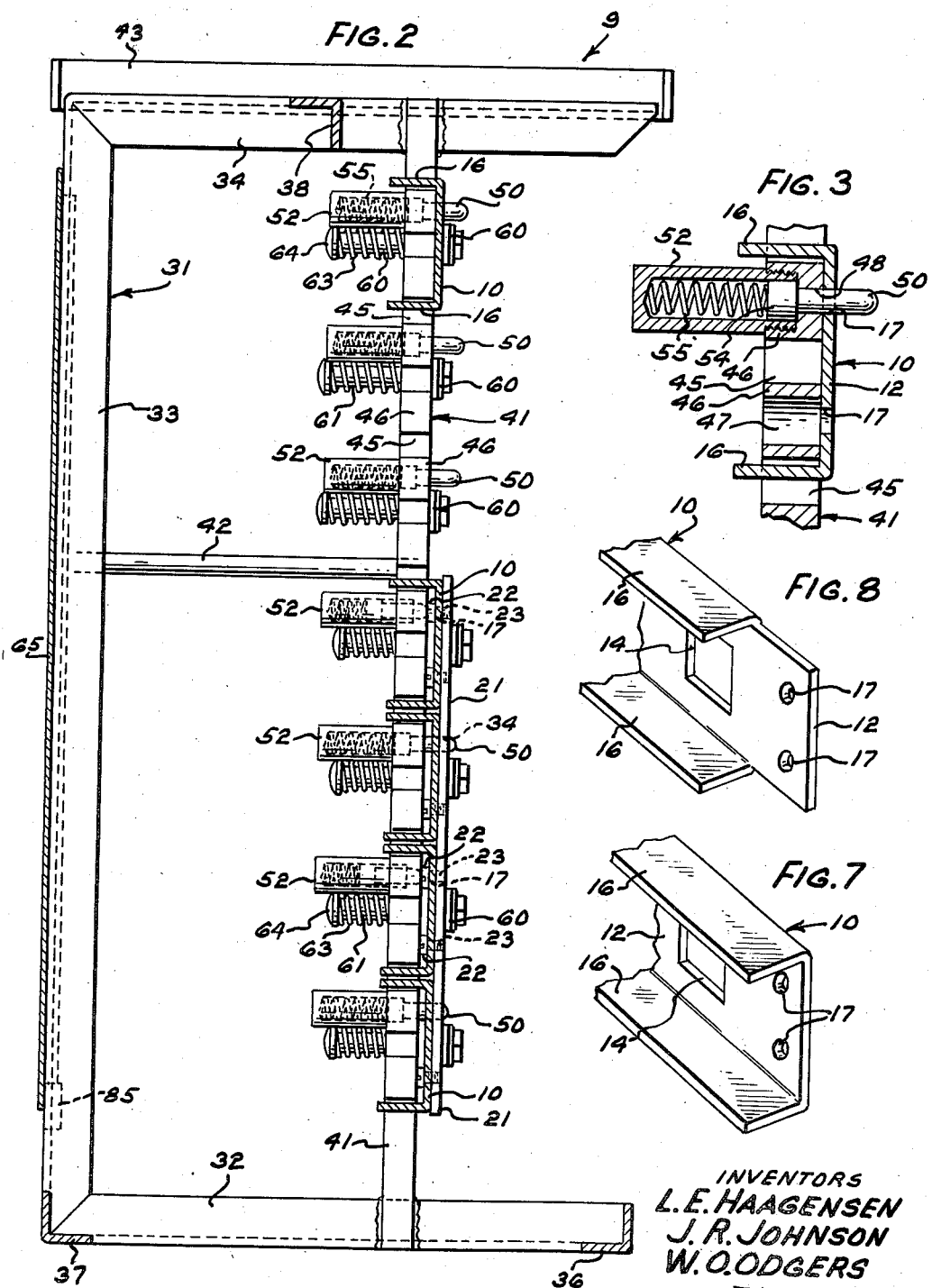

Aug. 11, 1959  L. E. HAAGENSEN ET AL  2,899,196
UNIVERSAL FIXTURE FOR SUPPORTING VARIOUS PARTS TO BE WORKED
Filed July 21, 1954  3 Sheets-Sheet 3
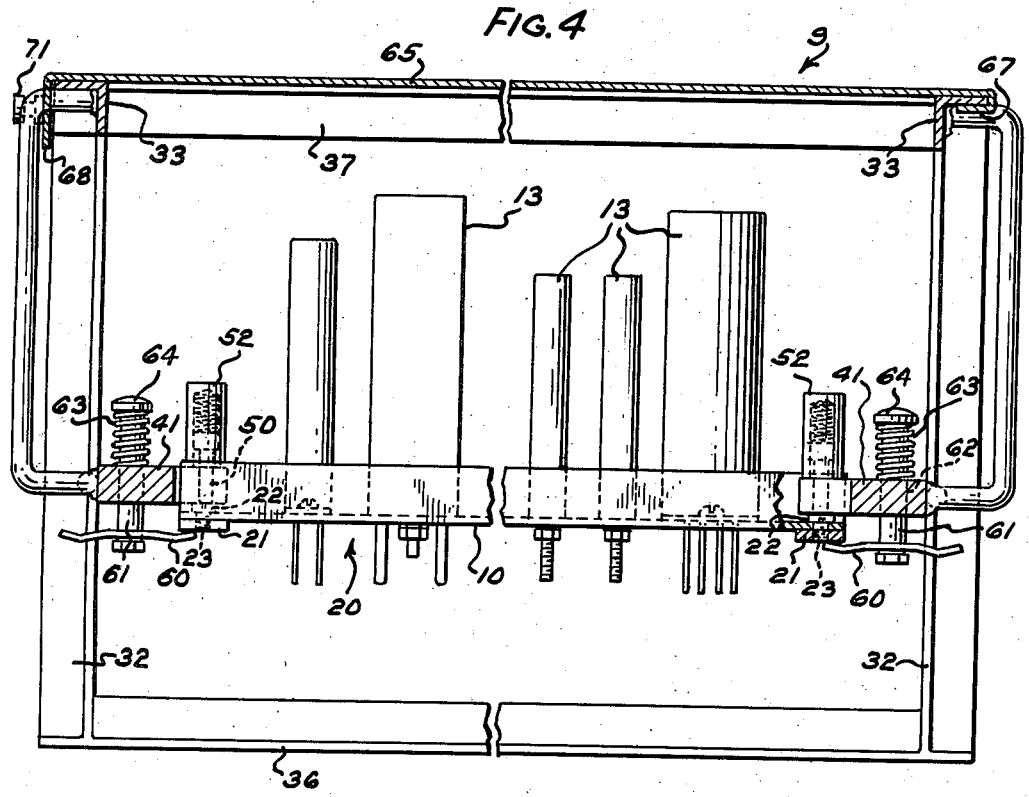
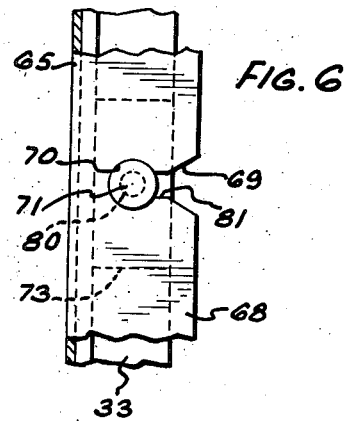
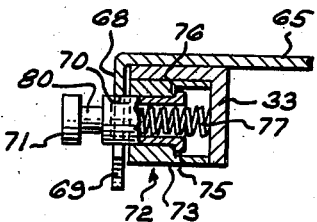
INVENTORS
L. E. HAAGENSEN
J. R. JOHNSON
W. O. ODGERS
BY
ATTORNEY United States Patent Office 2,899,196
Patented Aug. 11, 1959

2,899,196

UNIVERSAL FIXTURE FOR SUPPORTING VARIOUS PARTS TO BE WORKED

Leif E. Haagensen, Barrington, Joel R. Johnson, Chicago, and William O. Odgers, Clarendon Hills, Ill., assignors to Western Electric Company, Incorporated, New York, N.Y., a corporation of New York Application July 21, 1954, Serial No. 444,714

3 Claims. (Cl. 269—130)

This invention relates to a fixture for supporting parts to be worked upon and more particularly to a fixture for supporting mounting plates of different widths having electrical components mounted thereon to permit the wiring of the components.

An object of the invention is to provide a fixture for supporting parts to be worked upon.

Another object of the invention is to provide a fixture for supporting mounting plates of different widths having electrical components mounted thereon to permit the wiring of the components.

A fixture illustrating certain features of the invention may include a frame having a base and a pair of spaced apart vertical frame elements provided with flat parallel front faces for receiving the ends of channel-shaped mounting plates thereagainst and having a plurality of clearance slots extending inwardly from one edge thereof for receiving the flanges of the mounting plates and forming a plurality of lugs on each vertical frame element, one set of alternate ones of which are provided with cylindrical apertures therethrough and the other set of alternate ones of which are apertured and provided with spring-pressed retractable pins normally projecting therefrom for engaging aligned apertures in the end portions of the mounting plates for supporting the plates against vertical displacement. The vertical frame elements have a plurality of spring-pressed clamps yieldably mounted thereon which may be moved to engage the end portions of the mounting plates and press them against the frame elements.

Other objects and advantages of the invention will become more apparent by reference to the following detailed description thereof and the accompanying drawings illustrating a preferred embodiment, in which—

Fig. 2 is a vertical sectional view taken along the line 2—2 of Fig. 1;

Fig. 3 is an enlarged fragmentary vertical sectional view through a portion of the fixture;

Fig. 4 is a plan sectional view taken along the line 4—4 of Fig. 1;

Fig. 5 is an enlarged fragmentary horizontal sectional view through the cover latching device taken along the line 5—5 of Fig. 1;

Fig. 6 is a fragmentary elevational view of a portion of the fixture showing the cover latching device; and Figs. 7 and 8 are fragmentary perspective views of end portions of two types of channel-shaped mounting plates.

Figure 1:
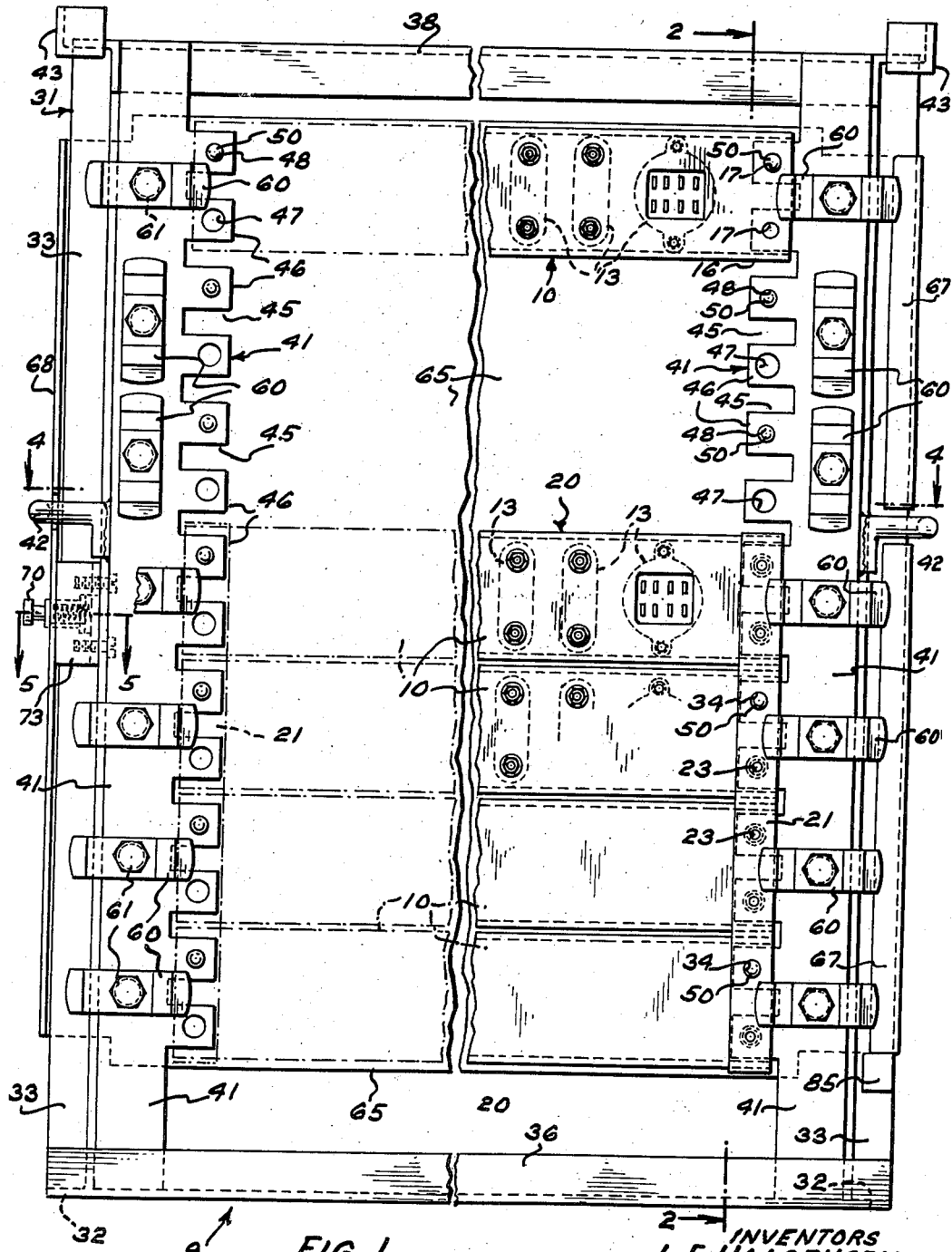
Fig. 1 is a front elevational view of a fixture with parts broken away and showing several types of mounting plates supported thereon.

The present fixture 9 was devised to releasably support mounting plates 10 of the type used in the telephone communications field on which are mounted various electrical components so that the components may be supported in an accessible position and worked upon. The mounting plates 10 shown herein are in the form of channel-shaped members of predetermined length having a web 12, to which are attached various electrical components 13, such as relays, resistors, electronic tubes, condensers, etc., having terminals which extend through openings 14 in the web. Strengthening flanges 16 are provided along the edges of the web, which in some types of mounting plates are coextensive with the web as shown in Fig. 7, and in other types terminate a predetermined distance from the ends of the web as shown in Fig. 8. On the end portions of the webs the mounting plates are provided with a pair of apertures or perforations 17 through which the shanks of fastening screws pass when the mounting plates 10 are secured to permanent vertical frame members of the telephone apparatus. The mounting plates 10 may be used as a single plate unit, or they may be frabricated in groups of multiple plate units, as indicated at 20 in Fig. 1, in which there are shown four mounting plates 10 secured at each end to mounting bars 21 by a plurality of headed screws 22, the shanks of which pass through the apertures 17 in the mounting plates and engage threaded apertures 23 in the bar 21. The bars 21 have a plurality of threaded apertures 23 and cylindrical apertures 34 formed therein at uniform distances and the arrangement of the threaded apertures and the cylindrical apertures varies with the different types of mounting bars 21 and the number of mounting plates to be assembled thereon into multiple plate units. In the multiple plate unit 20, as indicated in Fig. 1, one set of alternate mounting plates is secured at each end to the mounting bars 21 by a pair of screws 22 which pass through the perforations 17 of the mounting bar and into the threaded apertures 23 and the other set of mounting plates is secured thereto at each end by one screw 22 which passes through one of the perforations 17 into a threaded aperture 23, the other perforation 17 of the plate 10 being aligned with a cylindrical aperture 24 of the mounting plate.

The fixture 9 comprises a framework including a pair of U-shaped angle iron end frames 31 having portions 32 engageable with a work bench or horizontal supporting surface, vertical portions 33, and upper horizontally disposed arm portions 34. The side frames 31 are interconnected at the bottom by a pair of angle iron bars 36 and 37 welded thereto and at the top by an angle iron bar 38 welded to the arms 34 intermediate their ends. A pair of upright main frame elements 41—41 in the form of rectangular bars are welded at their ends to the horizontal arms 32 and 34 intermediate the ends thereof. Handles 42 are welded to the main frame elements 41 and the vertical portion 33 of the end frame to facilitate carrying the fixture. To permit stacking of the fixtures, angle irons 43 are welded to the horizontal arm portions 34 of the end frames and with the vertically disposed wall of the angle iron extending above the end frames and having end portions bent at right angles and cooperating therewith to form retaining walls for retaining another fixture stacked thereon.

Portions of the front faces of the upright frame elements 41 are adapted to engage the web portions 12 of the mounting plates 10 and the elements 41 are provided along their inner edges with a plurality of rectangular clearance slots 45 for receiving the flanges 16 of the mounting plates. The projections or lugs 46 formed by the slots 45 are relatively narrow and one set of alternate ones are provided with relatively large cylindrical apertures 47 and the other set of alternate lugs are provided with shouldered apertures 48 having a cylindrical portion for guiding aligning pins 50 for reciprocable movement therein. The enlarged ends of the apertures 48 are threaded for receiving the threaded ends of tubular members 52, the cylindrical bores of which slidably receive the enlarged heads 54 of the pins 50. Springs 55 within the tubular members 52 urge the pins 50 to their normal outer positions, as shown in Fig. 3, with the ends thereof projecting a predetermined distance from the front face of the elements 41. When a mounting plate is applied to the fixture it overlays and encloses two of the lugs 46 thereof and the perforations 17 in the mounting plate are aligned with the apertures 47 and 48 in the lugs so that the aligning pin 50 fits into one of the perforations 17 and serves to hold it against movement in a plane parallel to the front face of the frame elements 41.

Means are provided for holding the mounting plate against the front face of the frame element 41, which includes a plurality of clamps 60 in the form of substantially rectangular sheet metal plates fixed intermediate their ends to rods 61. The rods 61 are slidably mounted in bearing apertures 62 in the frame elements 41 and have helical springs 63 encircling them and engaging heads 64 thereon for stressing the clamps 60 toward the frame elements 41. The clamps 60 are relatively narrow and when not used may be disposed in a vertical position in spaced relation to the ends of the mounting plates 10 applied to the fixture and when it is desired to clamp the mounting plate to the fixture, pressure is applied to the heads 64 to move the clamps 60 from the frame element 41, after which the clamp 60 may be rotated in overlapping relation to the mounting plate and the pressure removed from the head to permit the spring to retract the clamp and cause it to yieldably retain the mounting plate in engagement with the frame element.

The mounting plates 10 may be individually applied to the frame elements 41 over any pair of lugs 46 thereon and the aligning pins 50 will be aligned with and enter one of the perforations 17 at each end thereof for supporting the mounting plate on the fixture, the clearance slots 45 and the spacings of the lugs 46 being such that a second mounting plate may be applied to the fixture on the next adjacent pair of lugs 46.

In various combinations of multiple plate units of mounting plates, as, for example, the one indicated at 20 in Fig. 1, where the mounting plates 10 are secured to the mounting bars 21, it happens that both of the perforations 17 on each end of some of the mounting plates 10 are occupied by fastening screws 22, and on other mounting plates only one of the perforations 17 at each end thereof is used for receiving a fastening screw 22 therein, so that no clearance holes are available in some of the mounting plates in such a unit for the reception of the aligning pins 50. When such a unit is applied to the fixture, the alignment pins 50 will enter the perforations 17 and 24 in the mounting plates and mounting bars 10 and 21, respectively, aligned therewith and serve to support the multiple plate unit 20 against vertical displacement, and the aligning pins 50 positioned opposite the screws 22 of the multiple plate unit 20 will be engaged thereby and pushed back into a retracted position against the springs 55 and thus permit the multiple plate unit 20 to engage and be tightly pressed against the front face of the frame elements 41. Several of the clamps 60 may be manipulated to engage the mounting bar 21 to yieldably clamp the multiple plate unit 20 against the frame elements 41.

A cover 65 is provided to protect the electrical components 13 on the mounting plates 10 supported by the fixture during and after the wiring of the components. The cover 65 is in the form of a metal plate having one end thereof reversely bent to form a hook 67, which fits around one flange of the upright portion 33 of one of the angle iron end frames and at its opposite end the cover 65 has a flange 68 bent at right angles thereto and adapted to fit around the vertical portion 33 of the other angle iron end frame 31. The flange 68 of the cover has a keyhole slot 69 therein, the enlarged circular portion 70 of which is adapted to receive a cylindrical bolt 71 of a latching device 72. The bolt 71 is slidably mounted in an aperture in a block 73 secured to the angle member 33, and the bolt has a circular flange 75 engageable with a shoulder 76 of the block 73 and the angle member 33 to limit the movement thereof to predetermined forward and retracted positions. An annular groove adjacent one end of the bolt forms a reduced portion 80 therein which can pass through the narrow slotted portion 81 of the keyhole slot when the bolt is in its retracted position and the portion 80 of the bolt is aligned with the slot 81. The bolt 71 has a recess therein for receiving a spring 77, which urges the bolt outwardly to its normal forward position in which the enlarged portion of the bolt is aligned with the flange 68 and serves to lock the cover on the fixture. In order to remove the cover 65 from the fixture it is merely necessary to engage the end of the bolt 71 and push it to its retracted position and swing the flanged portion 68 of the cover from the fixture and then disengage the hooked end 67 therefrom. A block 85 welded to the vertical portion of the right end frame as viewed in Fig. 1 is engageable with the lower portion of the hook 67 of the cover to support it in a predetermined position.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for releasably supporting mounting plates thereon to permit components on the mounting plates to be worked on and wherein the mounting plates have apertures in the end portions thereof, said fixture comprising a base, a pair of vertically disposed frame members on said base having parallel vertical surfaces for receiving the mounting plates thereagainst, a plurality of pins, means for mounting said pins in a vertical row on each of said frame members in a prfedetermined spaced and parallel relation to each other for movement perpendicular to said vertical surfaces, resilient means for moving said pins to a normal forward position with the ends thereof extending from the frame members and engageable with the mounting plates in the apertures thereof to support the mounting plates thereon, and a plurality of clamping members mounted on the frame members and movable into engagement with the end portions of said mounting plates for releasably holding them against said vertical surfaces.

2. A portable fixture for releasably supporting mounting plates to permit components on the mounting plates to be worked on and wherein the mounting plates have mounting apertures in the end portions thereof, said fixture comprising a base, a plurality of upright frame members on said base including a pair of substantially vertically disposed frame members having parallel surfaces for receiving the mounting plates thereagainst, means on the upper ends of said frame members forming a seat for receiving the base of another fixture to support the fixture thereon, a plurality of pins, means for mounting said pins in a vertical row on each of said vertical frame members in a predetermined spaced and parallel relation to each other for movement perpendicular to said surfaces, reislient means for moving said pins to a normal forward position with the ends thereof extending from the frame members and engageable with the mounting plates in the apertures thereof to support the mounting plates thereon, and a plurality of clamping members mounted on the frame members and movable into engagement with the end portions of said mounting plates for releasably holding them against the frame members.

3. In a fixture for releasably supporting channel-shaped mounting plates with flanges to permit components on the mounting plates to be worked on and wherein the plates have a pair of mounting apertures in each end portion thereof, the combination of a base, a pair of vertically disposed members on the base having vertical co-planar surfaces and each having a row of laterally extending lugs thereon with slots therebetween for receiving the flanges of the mounting plates, the lugs of one vertical member being opposite and directed toward the lugs of the other vertical member, supporting pins slidably mounted on alternate lugs for axial movement perpendicular to said vertical surfaces, resilient means for moving said pins to a normal forward position with the ends thereof extending from the frame members for engaging the mounting plates in the apertures thereof to support the mounting plates, the lugs and spaces therebetween being proportioned relative to the mounting plates to permit the mounting plates to be selectively applied to the fixture with each end supported on a pin in either of two positions and with the pin in either one of the pair of mounting apertures in each end of the mounting plate, and a plurality of clamping members mounted on the vertical members and movable into engagement with the end portions of said mounting plates for releasably holding them against said vertical surfaces.

References Cited in the file of this patent

UNITED STATES PATENTS

| | | |
|---|---|---|
| 1,795,363 | Cunningham | Mar. 10, 1931 |
| 2,275,894 | Ferguson | Mar. 10, 1942 |
| 2,351,276 | Malhiot | June 13, 1944 |
| 2,441,208 | Roeder | May 11, 1948 |
| 2,452,985 | Bourdette | Nov. 2, 1948 |
| 2,505,665 | Franck | Apr. 25, 1950 |
| 2,512,908 | Arndt | June 27, 1950 |
| 2,577,509 | Bryant | Dec. 4, 1951 |
| 2,588,810 | Dietrich | Mar. 11, 1952 |
| 2,614,157 | Montgomery | Oct. 14, 1952 |
| 2,685,824 | Coop | Aug. 10, 1954 |